Sept. 2, 1969  M. QUERCIA  3,464,578
PLASTIC MATERIAL LIGHTER TANKS FOR GASES UNDER PRESSURE
AND METHODS OF MANUFACTURING SUCH TANKS
Filed March 20, 1967  2 Sheets-Sheet 1
*Fig. 1.*
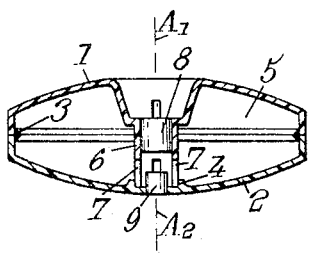
*Fig. 2.*
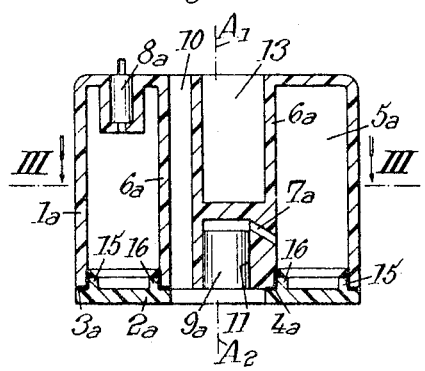
*Fig. 3.*
INVENTOR
Marcel Quercia
BY Michael S. Striker,
ATTORNEY Sept. 2, 1969  M. QUERCIA  3,464,578
PLASTIC MATERIAL LIGHTER TANKS FOR GASES UNDER PRESSURE
AND METHODS OF MANUFACTURING SUCH TANKS
Filed March 20, 1967  2 Sheets-Sheet 2

INVENTOR
Marcel Quercia
BY Michael S. Striker
ATTORNEY

3,464,578
PLASTIC MATERIAL LIGHTER TANKS FOR GASES UNDER PRESSURE AND METHODS OF MANUFACTURING SUCH TANKS
Marcel Quercia, Paris, France, assignor to Societe Flaminaire Marcel Quercia, Paris, France
Filed Mar. 20, 1967, Ser. No. 624,273
Claims priority, application France, Mar. 24, 1966, 54,894
Int. Cl. F17b 1/00
U.S. Cl. 220—3
6 Claims

ABSTRACT OF THE DISCLOSURE

Two tank elements molded separately from a thermoplastic material are welded with each other by rotating them with respect to each other about their common axis while tightly applying them against each other in the direction of said axis, said elements having corresponding pairs of ridges circular about said axis adapted to cooperate together respectively, the two inner ridges belonging respectively to one of the elements and to the end of a bracing member integral with the other element.

---

The present invention relates to a compressed gas tank of plastic material for a cigarette, cigar or pipe lighter and to the method of manufacturing the same. Said tank may be removable from the lighter or it may constitute a fixed portion of the casing thereof. It may also contain fuel for refilling a lighter.

The invention is concerned with tanks of this kind which are constituted by the assembly of two elements molded separately, this assembly being preferably performed by welding, one of the elements forming the upper portion of the tank and the other element the lower portion thereof.

The chief object of the invention is to improve the resistance of the tank against the internal pressure exerted by the compressed gas, which is generally in the liquefied state.

The main feature of the tank according to this invention lies in the provision, therein of a bracing member extending between the top and bottom walls thereof and which either is integral with one of said elements and welded to the other or is made of two portions respectively integral with said elements and welded together.

This bracing member may be hollow over at least a portion of its height so as to accommodate some parts or accessories of the lighter.

Concerning the method of manufacturing the tank according to the present invention, the two elements of the tank are preferably made of thermoplastic material and connected together by spin welding, that is to say by rotating one of these elements with respect to the other and by applying them against each other, the heat of friction causing an autogenous welding along the surfaces of the two elements in contact with each other.

In order to carry out this welding method there are provided, on each of the two elements of the tank, two concentric contact areas along which are performed, on the one hand the welding of the outer wall portions of the tank and, on the other hand, the welding either between the bracing member integral with one of the elements and the other one, or between two portions of the bracing member, each of these portions being integral with one of the tank elements, respectively.

Preferred embodiments of the present invention will be hereinafter described with reference to the appended drawings, given merely by way of example, and in which:

FIG. 1 is an axial sectional view of a pocket lighter tank made according to the present invention;

FIG. 2 is an axial sectional view of a tank made according to a modification;

FIG. 3 is a horizontal section on the line III—III of FIG. 2;

Figure 4:
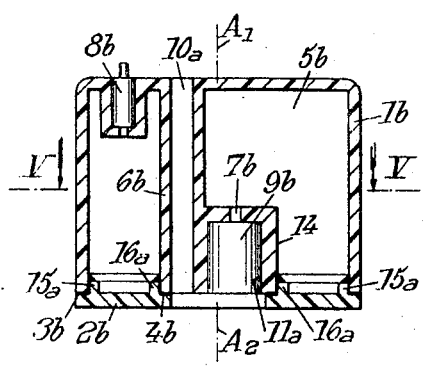
FIG. 4 is a view similar to FIG. 2 but relating to a third embodiment.

The tank according to the present invention is made of two elements 1 and 2 molded separately, preferably from a thermoplastic material, said elements being connected together at the periphery by weld 3.

According to the invention one of the elements, for instance element 1, carries, integral therewith, a bracing member 6 which, when said element is assembled with element 2, is welded to the bottom thereof through a circular weld 4. The space in which fuel is located in the tank has, in all the embodiments of the invention, an annular shape.

Bracing member 6 opposes deformations of the bottoms of elements 1 and 2 which might result from variations in the pressure of the contents of the tank, for instance in response to variations of the ambient temperature, such variations being prevented even if the tank elements are relatively thin.

In the embodiment of FIG. 1, elements 1 and 2 are two complementary shells forming together a fuel gas tank for a lighter.

Bracing member 6 is in the form of a tube which communicates, through peripheral slots 7, with the annular space 5 of the tank and the ends of said bracing member communicate, through valves 8 and 9, with the outside.

Valve 9 may serve to the filling of the tank with gas liquefied under pressure, whereas valve 8 is a delivery valve for feeding gas to the lighter when the latter is to be operated.

When it is desired to provide a tank for the refilling of lighters, this tank may be made as shown by FIG. 1. However it is then made higher and a flat bottom ensuring a good stability thereof is provided for resting upon a horizontal surface. In this case, tube 6 is a plunger tube which communicates through slots 7, with the inside of the tank, said plunger tube being adapted to be connected, through valve 8, with the tank of the lighter to be refilled.

According to another embodiment of the invention, the tank is not removable but constitutes the main portion of the body of a gas lighter. It may then serve to support an ignition mechanism. Embodiments of this type are shown by FIGS. 2 to 5.

In FIGS. 2 and 3 the tank elements are designated by 1a and 1b.

In bracing member 6a there is provided, as shown by FIG. 2, a rectilinear conduit 10 extending longitudinally throughout it and opening into a central aperture of element 2a, this conduit 10 having no communication with the inside of annular tank 5a. This conduit 10 may for instance accommodate the flint and spring guiding tube belonging to the lighter ignition mechanism.

Conduit 10 is disposed eccentrically in bracing member 6a, as shown in FIGS. 2 and 3, which permits of providing, in said bracing member, a housing 11 communicating through a duct 7a with annular tank 5a, and through a valve 9a, with the outside.

Above housing 11 there is provided, in bracing member 6a, another housing 13 which reduces the weight of the bracing member, permits of saving material and may accommodate either another portion of the ignition mechanism or an electric igniting device, or again accessories and the like.

Housing 13 may also constitute a second tank for a fluid for instance adapted to promote ignition of the lighter.

The useful volume of housing 13 may also be added to that of the annular tank that surrounds it.

Figure 5:
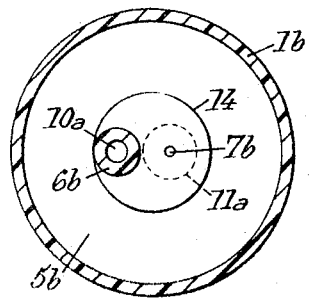
FIG. 5 is a view of a horizontal section on the line IV—IV of FIG. 4.

In the embodiment of FIGS. 4 and 5, the two elements of the tank are designated by 1b and 2b. The bracing member is designated by 6b and comprises, in its lower portion, an enlargement 14 with respect to which the upper portion of said member 6b is eccentric. The bracing member is provided, over its whole length, with a conduit 10a analogous to the conduit 10 of FIGS. 2 and 3. The enlarged lower portion of the bracing member forms a housing 11a which communicates through a duct 7a, with the inside 5b of the tank and, through a valve 9b, with the outside.

Element 1b may be molded either by means of a soluble core adapted to be dissolved after molding in a solvent which is not a solvent of the material of element 1b, or by means of a core made of several portions which can be separated from one another for unmolding and be extracted separately from the recess 5b of element 1b.

In the embodiments of the invention illustrated by the drawings, the outer wall of the tank and consequently the weld designated respectively by 3, 3a, 3b, between the two elements, designated respectively by 1, 2 (FIG. 1), 1a, 2a (FIGS. 2 and 3), 1b, 2b (FIGS. 4 and 5), are circular.

In order to effect not only the welding, at 3, 3a, 3b but also and simultaneously the welding at 4, 4a, 4b between the lower end of bracing member 6, 6a, 6b and the tank element 2, 2a, 2b by spin welding, at least the lower portion of the bracing member is given an outline coaxial with the weld 3, 3a, 3b, the common axis of these two welds being line $A_1$—$A_2$.

In the two embodiments illustrated by FIGS. 2, 3 and 4, 5, respectively, elements 2a and 2b consist of annular plates. Each of these plates is provided with two concentric ridges designated by 15 and 16 for FIGS. 2, 3 and 15a and 16a for FIGS. 4 and 5, which bear against the inside of the annular walls of element 1a, 1b thus improving the guiding during the relative rotation of the elements of the tank for spin welding.

The above described embodiments have been given merely by way of example, but the upper portion of the bracing member may be integral with element 1 whereas the lower portion of said bracing member is integral with element 2 so that the weld for assembling said bracing member portions is located at a substantial distance from the bottom of the tank.

In a general manner, while the above description discloses what are deemed to be practical and efficient embodiments of the present invention, said invention is not limited thereto as their might be changes made in the arrangement, disposition and form of the parts without departing from the principle of the invention.

What I claim is:

1. A tank of plastic material for a gas under pressure to be used in a lighter, said tank comprising, in combination, a pair of elements having in the region of the outer periphery thereof first circular edge surfaces and being joined at said edge surfaces to each other, at least one of the elements being cup-shaped; a bracing member integral at one end with one of said elements and having at its other end at least one circular edge surface concentric with said first edge surfaces of said elements and being joined to at least a second edge surface of the other element radially inwardly of and concentric with the first circular edge surface thereof, whereby said edge surfaces may be joined to each other by spin welding; and inlet and outlet valve means carried by and communicating with the interior of said tank.

2. A tank as defined in claim 1, wherein said bracing member is hollow at least over part of its height and including passage means providing communication between the interior of said hollow passage means and that of said tank, at least one of said valve means being located in the interior of said bracing member.

3. A tank as defined in claim 1, wherein said bracing member has an outer surface concentric with said first circular edge surfaces.

4. A tank as defined in claim 1, wherein said bracing member is formed with a longitudinal passage therethrough extending throughout the tank and being open at both ends.

5. A tank as defined in claim 1, wherein the end portion of said bracing member integral with said one element is eccentrically arranged with respect to the opposite end portion thereof.

6. A tank as defined in claim 1, wherein said bracing member is integral with said cup-shaped element and the other of said pair of elements being substantially flat.

References Cited

UNITED STATES PATENTS

| 2,476,593 | 7/1949 | Gereing. |
| 2,661,870 | 12/1953 | Huenergardt. |
| 2,790,609 | 4/1957 | Hawthorne et al. __ 206—52 XR |
| 3,120,570 | 2/1964 | Kennedy et al. _____ 264—45 |

FOREIGN PATENTS

| 597,798 | 9/1925 | France. |
| 23,561 | 3/1906 | Austria. |

RAPHAEL H. SCHWARTZ, Primary Examiner